No. 692,258. Patented Feb. 4, 1902.
A. W. EPRIGHT.
BOLT CUTTING MACHINE.
(Application filed Mar. 1, 1901.)
(No Model.) 13 Sheets—Sheet 1.
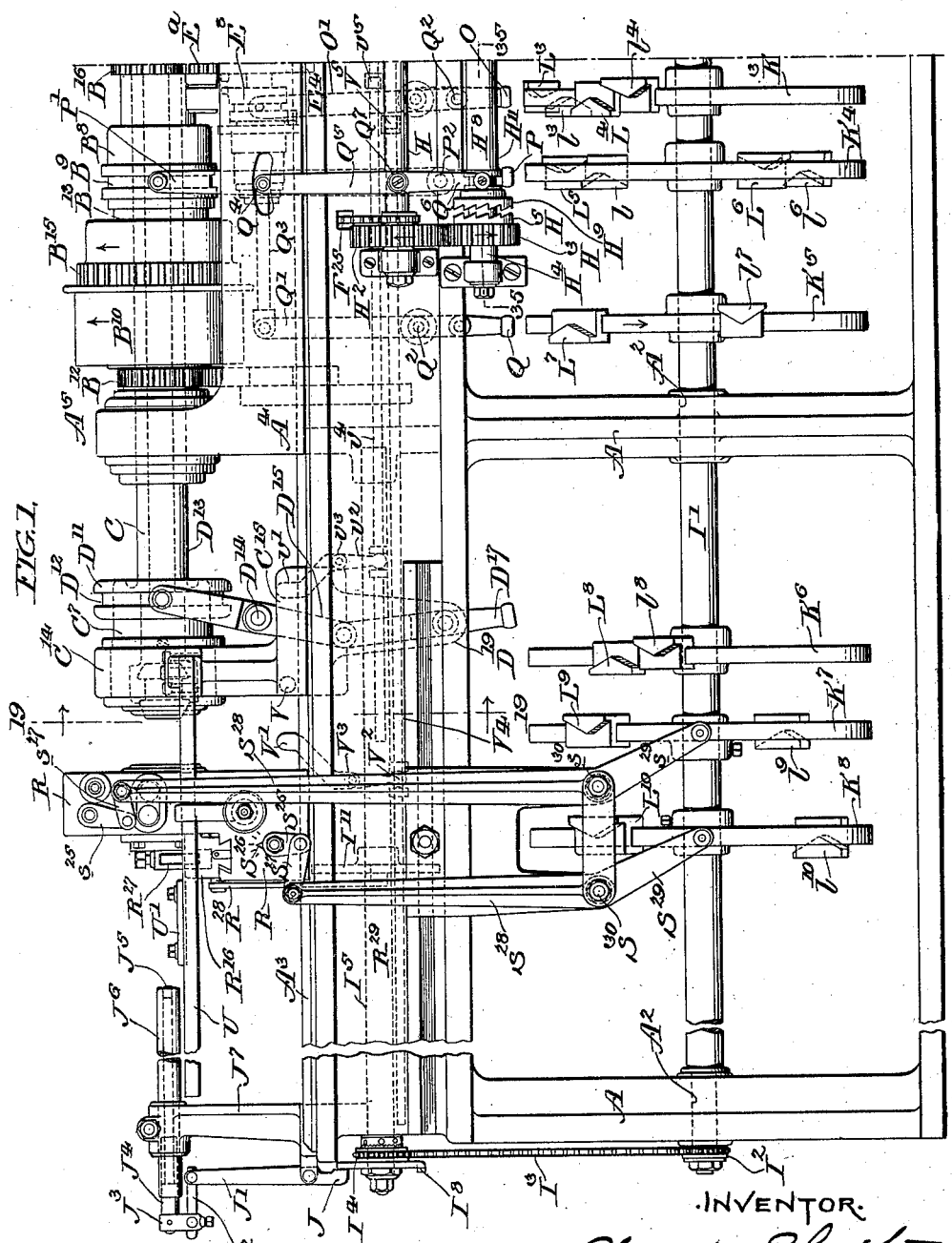
WITNESSES.
INVENTOR.
Alonzo W. Epright
by his atty,
Francis T. Chambers No. 692,258. Patented Feb. 4, 1902.
A. W. EPRIGHT.
BOLT CUTTING MACHINE.
(Application filed Mar. 1, 1901.)
(No Model.) 13 Sheets—Sheet 2.
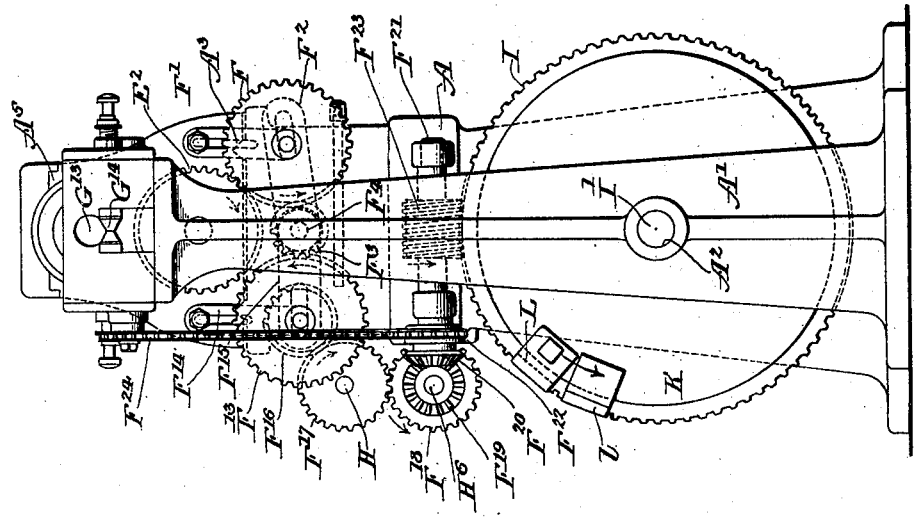
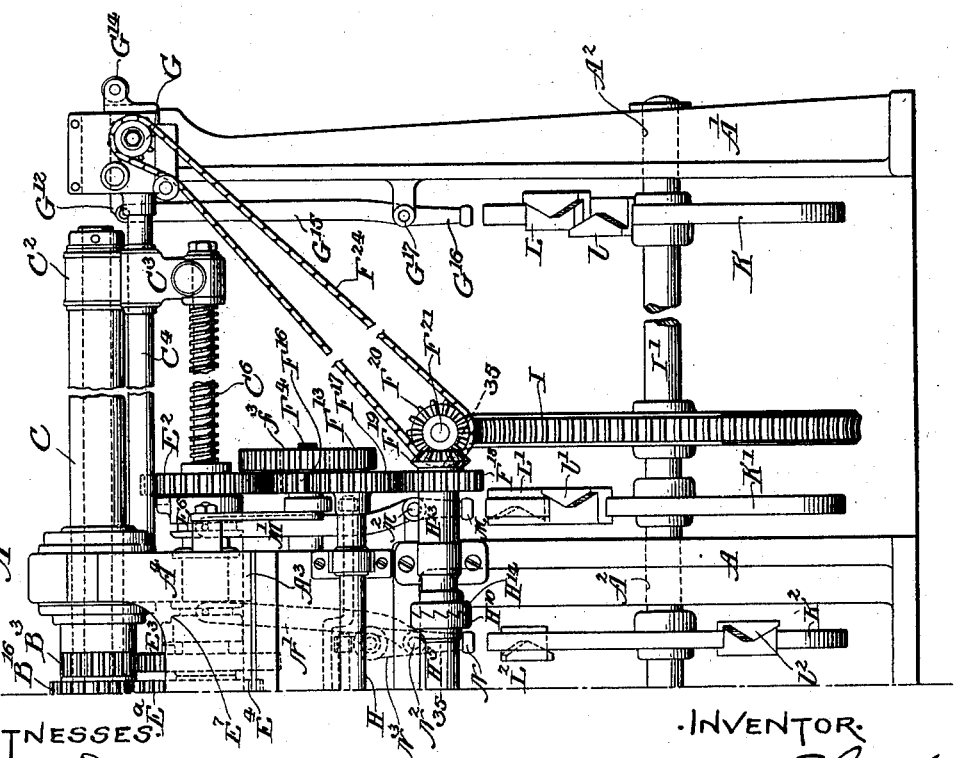
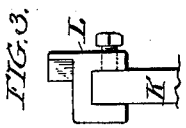

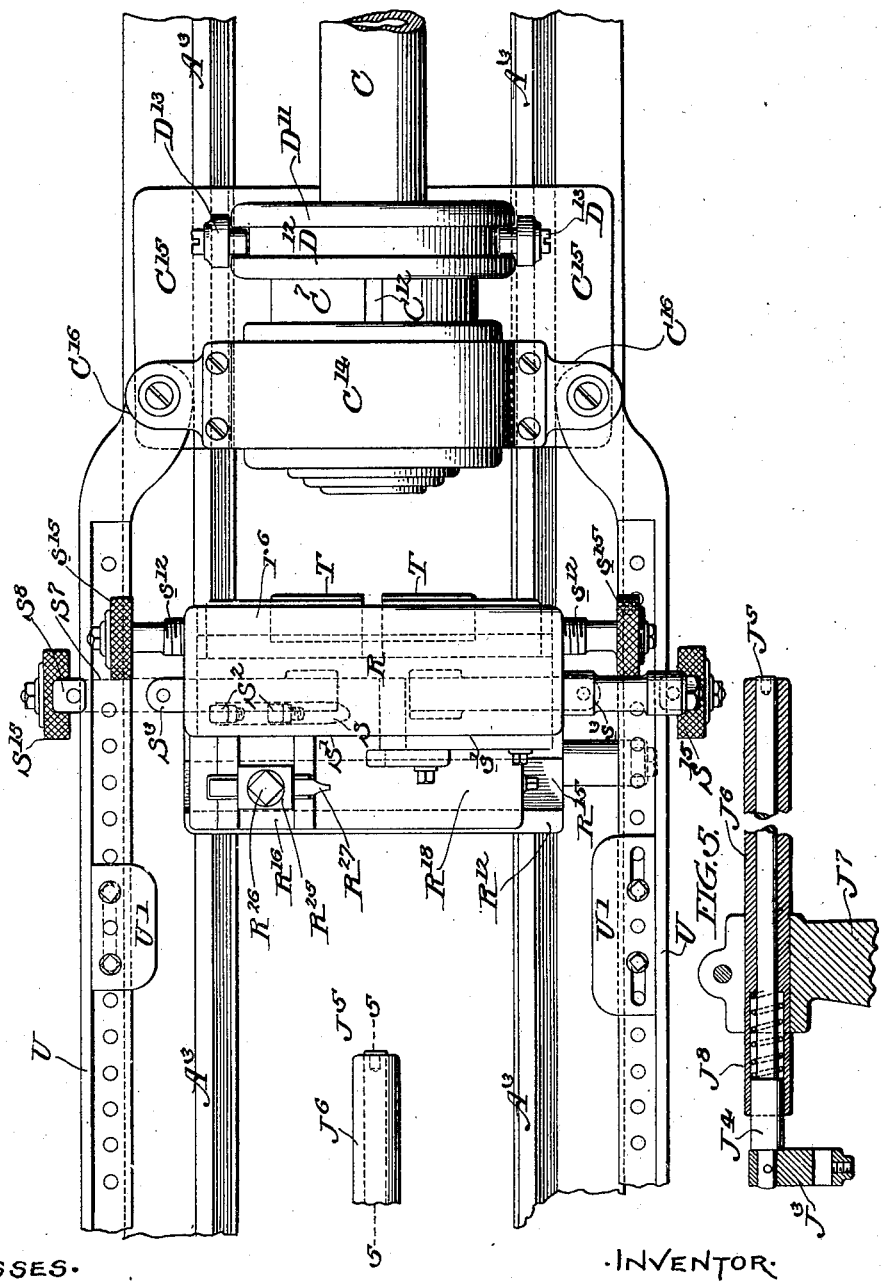

No. 692,258. Patented Feb. 4, 1902.
A. W. EPRIGHT.
BOLT CUTTING MACHINE.
(Application filed Mar. 1, 1901.)
(No Model.) 13 Sheets—Sheet 4.
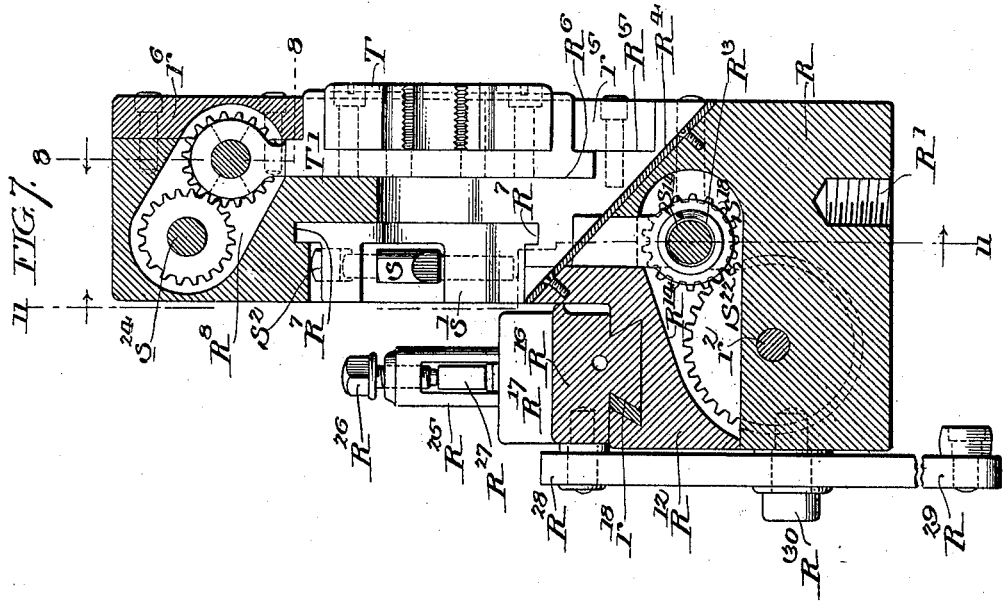
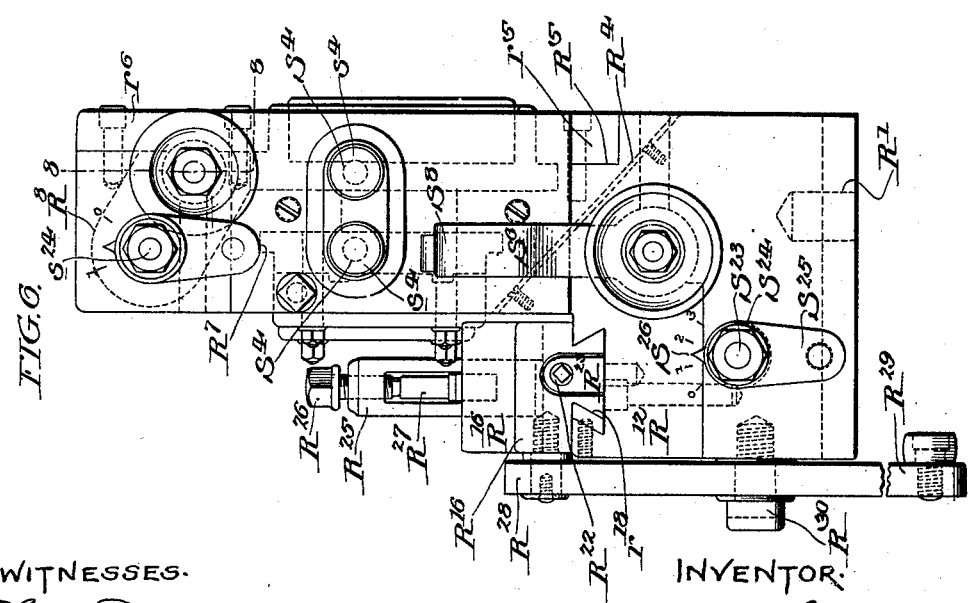
WITNESSES. INVENTOR.

No. 692,258. Patented Feb. 4, 1902.
A. W. EPRIGHT.
BOLT CUTTING MACHINE.
(Application filed Mar. 1, 1901.)
(No Model.) 13 Sheets—Sheet 5.
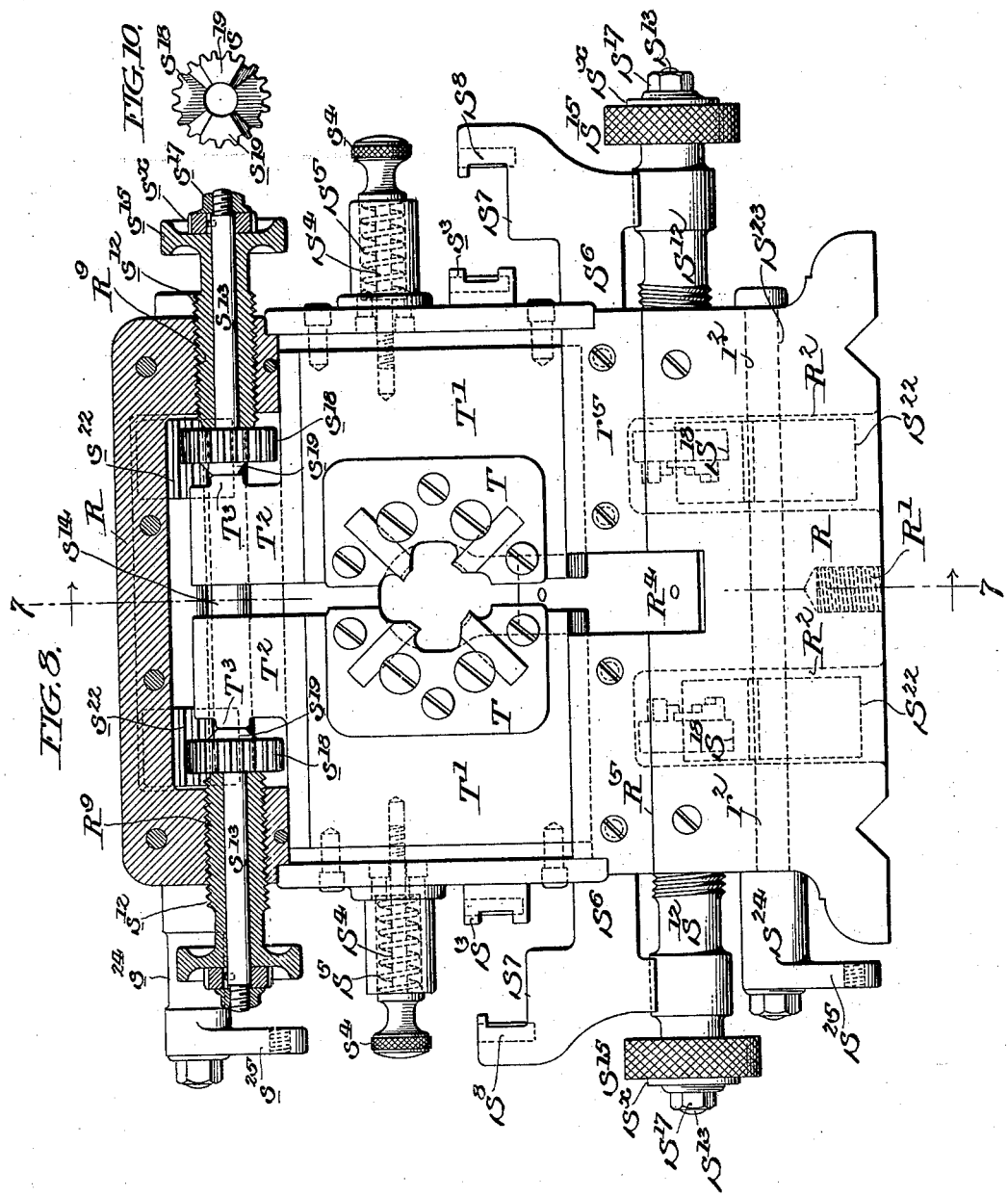

No. 692,258. Patented Feb. 4, 1902.
A. W. EPRIGHT.
BOLT CUTTING MACHINE.
(Application filed Mar. 1, 1901.)
(No Model.) 13 Sheets—Sheet 6.
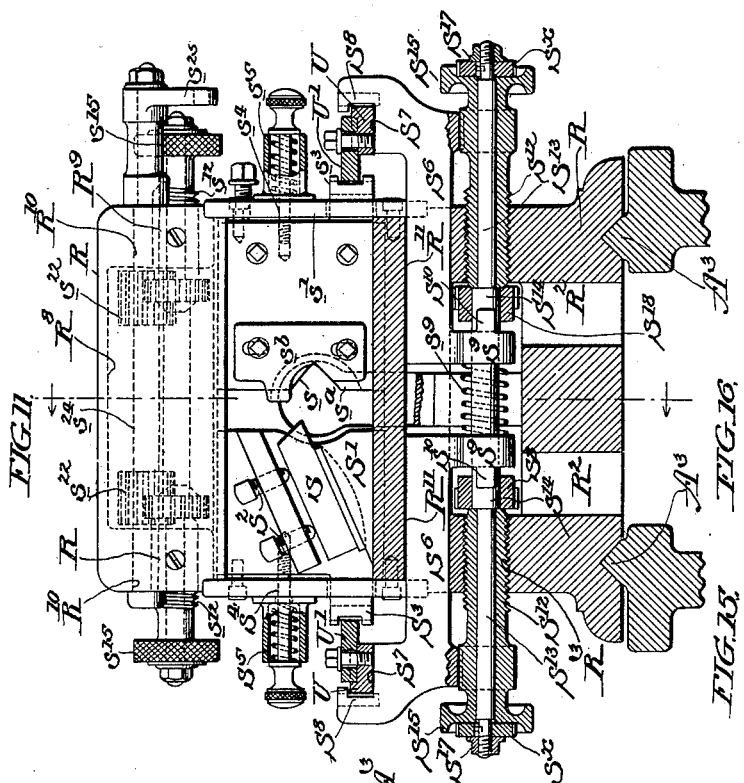
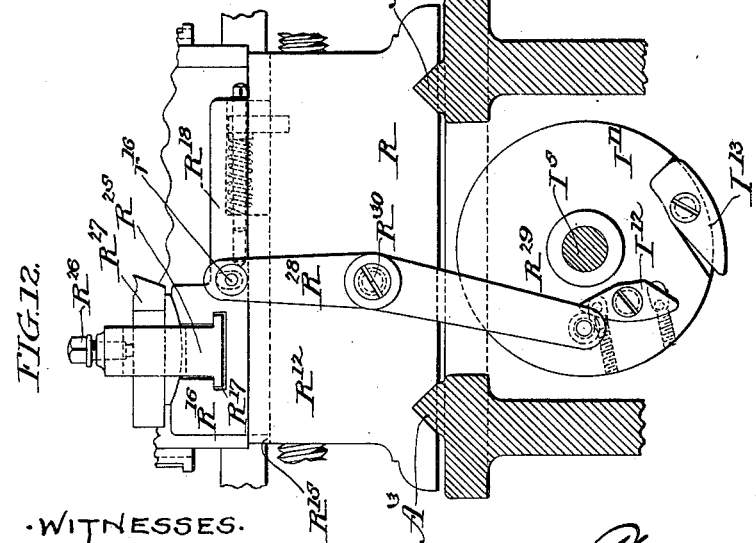
WITNESSES.
INVENTOR.
Alonzo W. Epright
by his atty.
THE NORRIS PETERS CO., PHOTO-LITHO., WASHINGTON, D. C.

No. 692,258. Patented Feb. 4, 1902.
A. W. EPRIGHT.
BOLT CUTTING MACHINE.
(Application filed Mar. 1, 1901.)
(No Model.) 13 Sheets—Sheet 7.
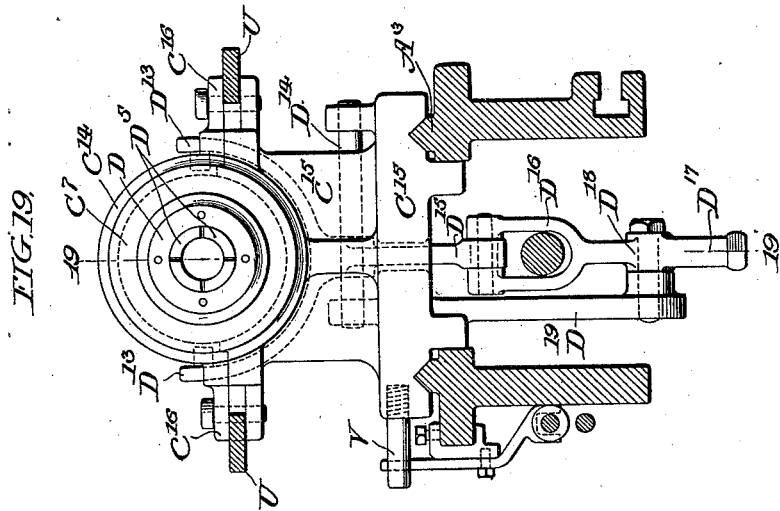
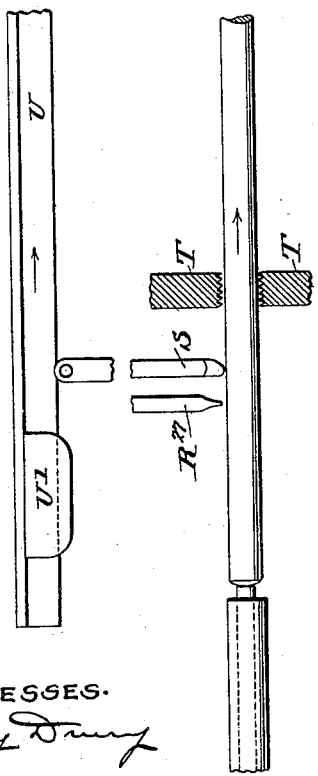
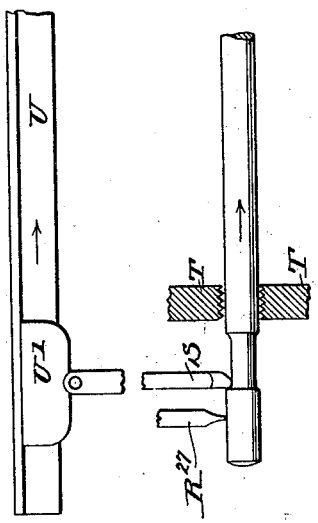
WITNESSES. INVENTOR.

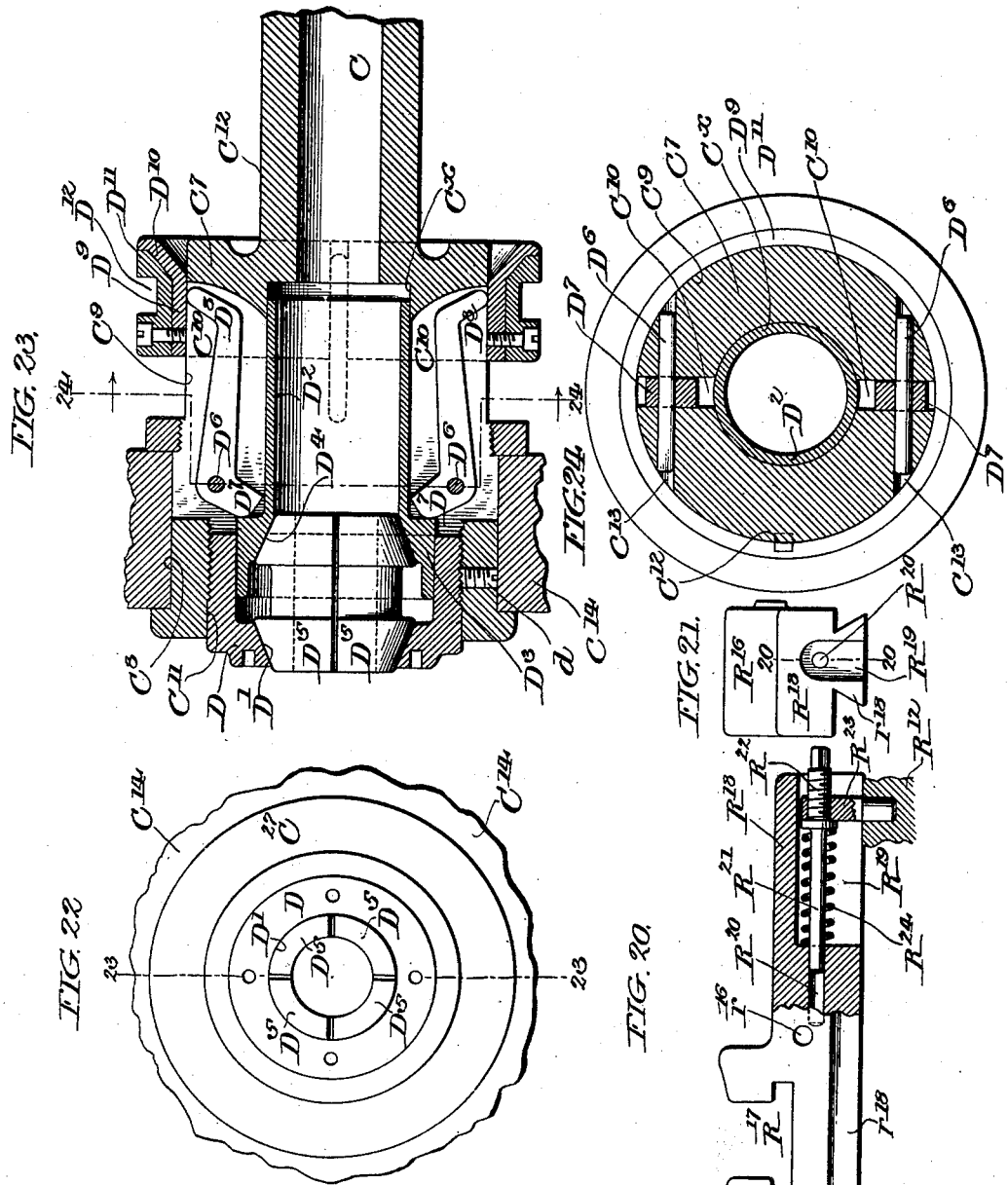

No. 692,258. Patented Feb. 4, 1902.
A. W. EPRIGHT.
BOLT CUTTING MACHINE.
(Application filed Mar. 1, 1901.)
(No Model.) 13 Sheets—Sheet 9.
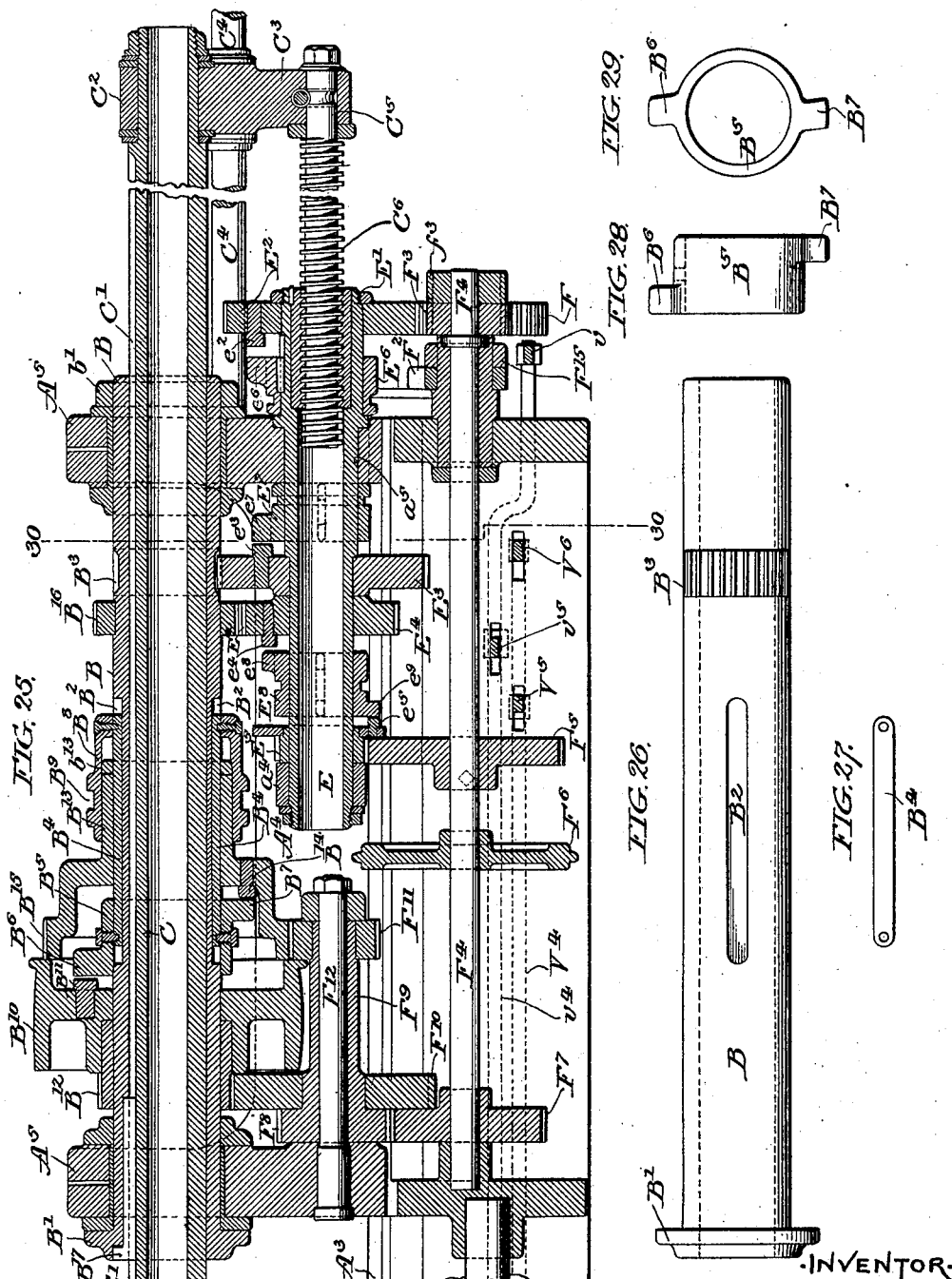
WITNESSES.
INVENTOR.

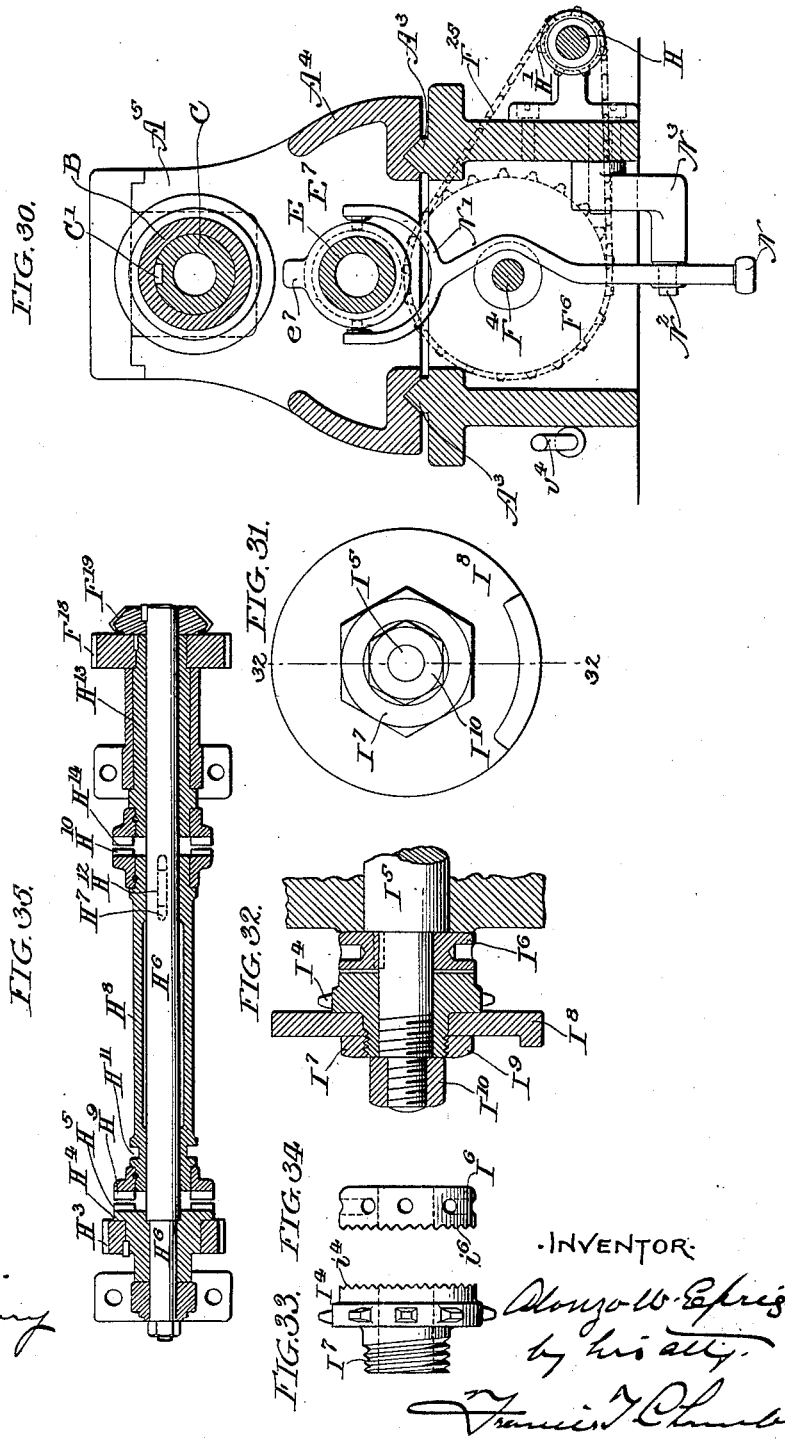

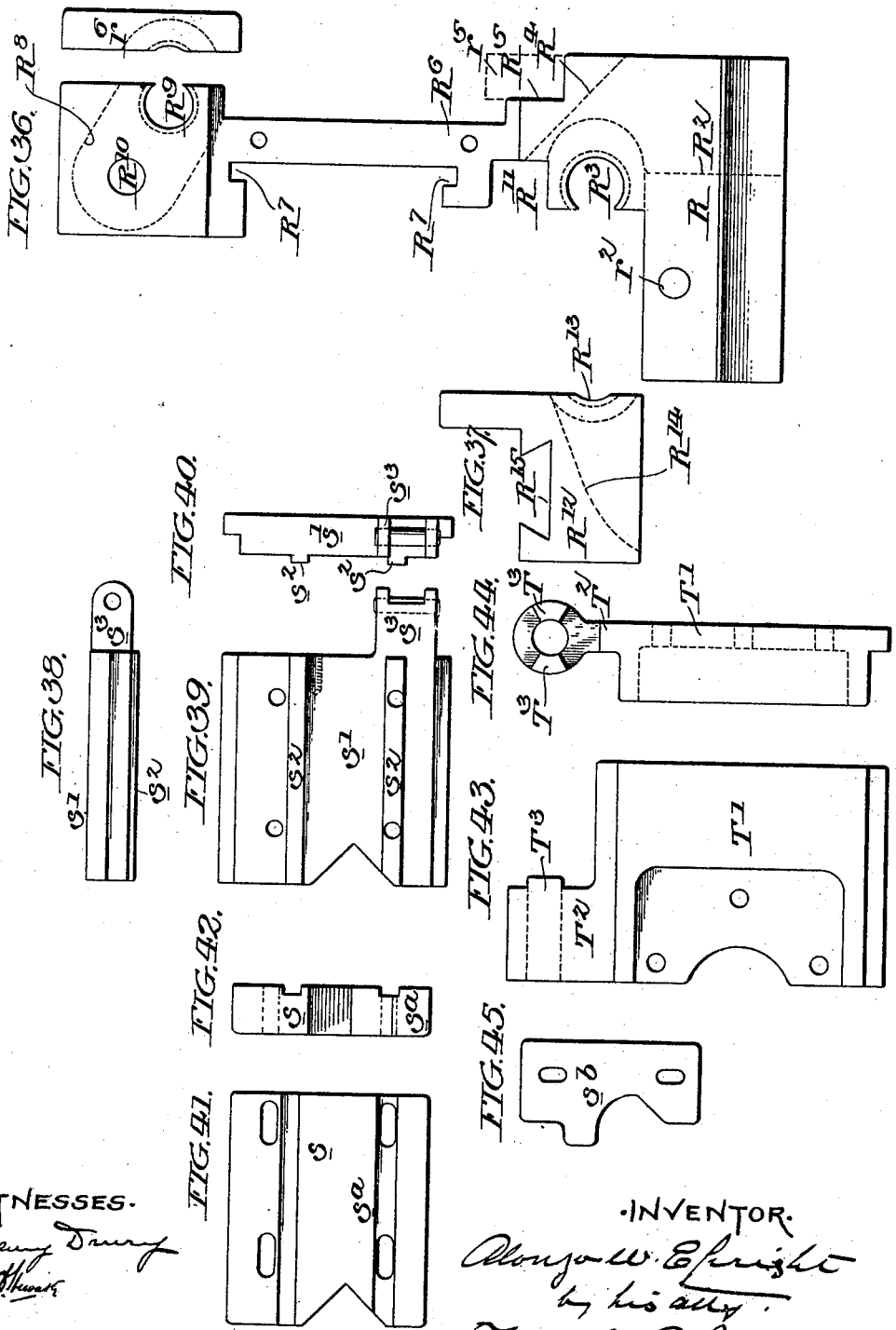

No. 692,258. Patented Feb. 4, 1902.
A. W. EPRIGHT.
BOLT CUTTING MACHINE.
(Application filed Mar. 1, 1901.)
(No Model.) 13 Sheets—Sheet 12.
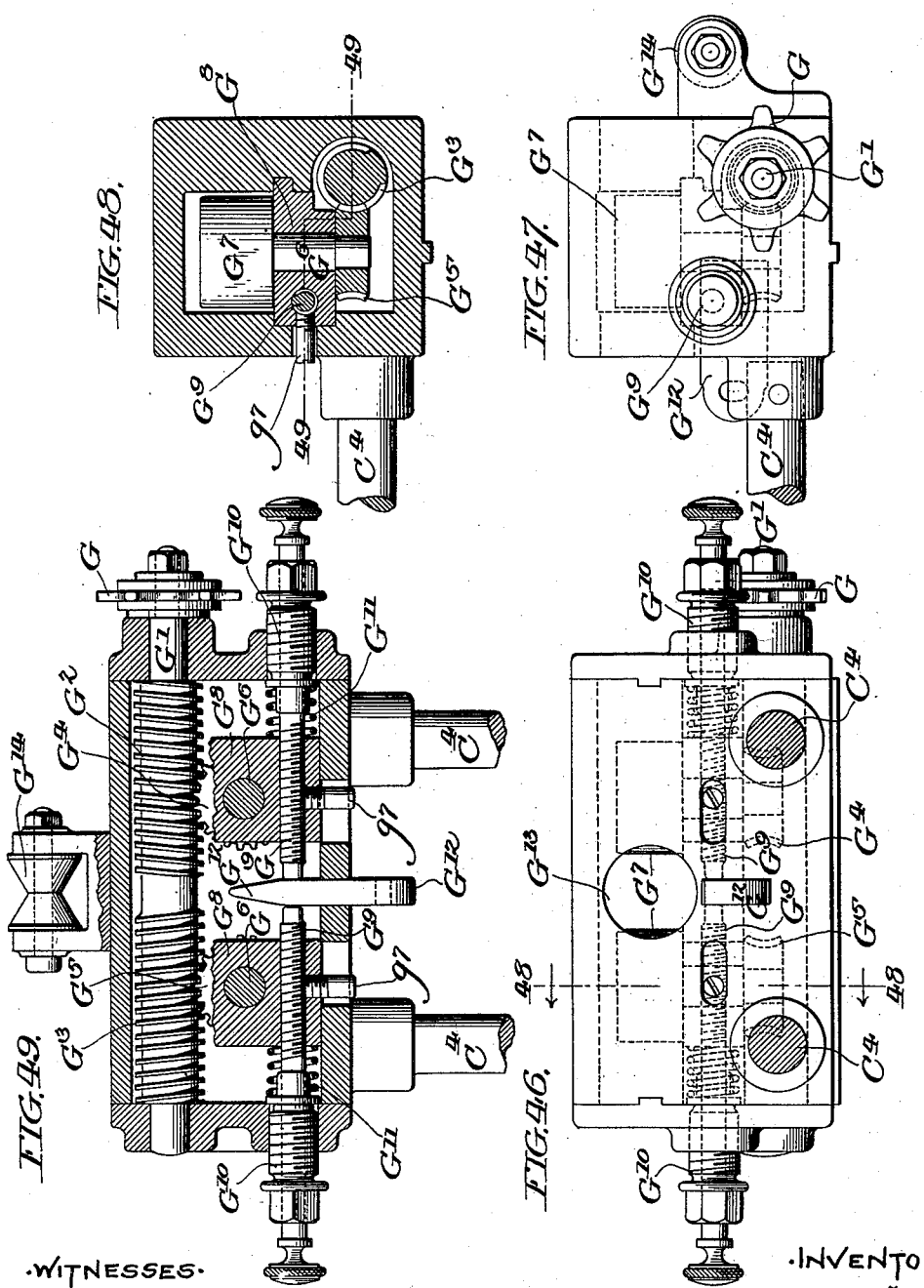

No. 692,258. Patented Feb. 4, 1902.
A. W. EPRIGHT.
BOLT CUTTING MACHINE.
(Application filed Mar. 1, 1901.)
(No Model.) 13 Sheets—Sheet 13.
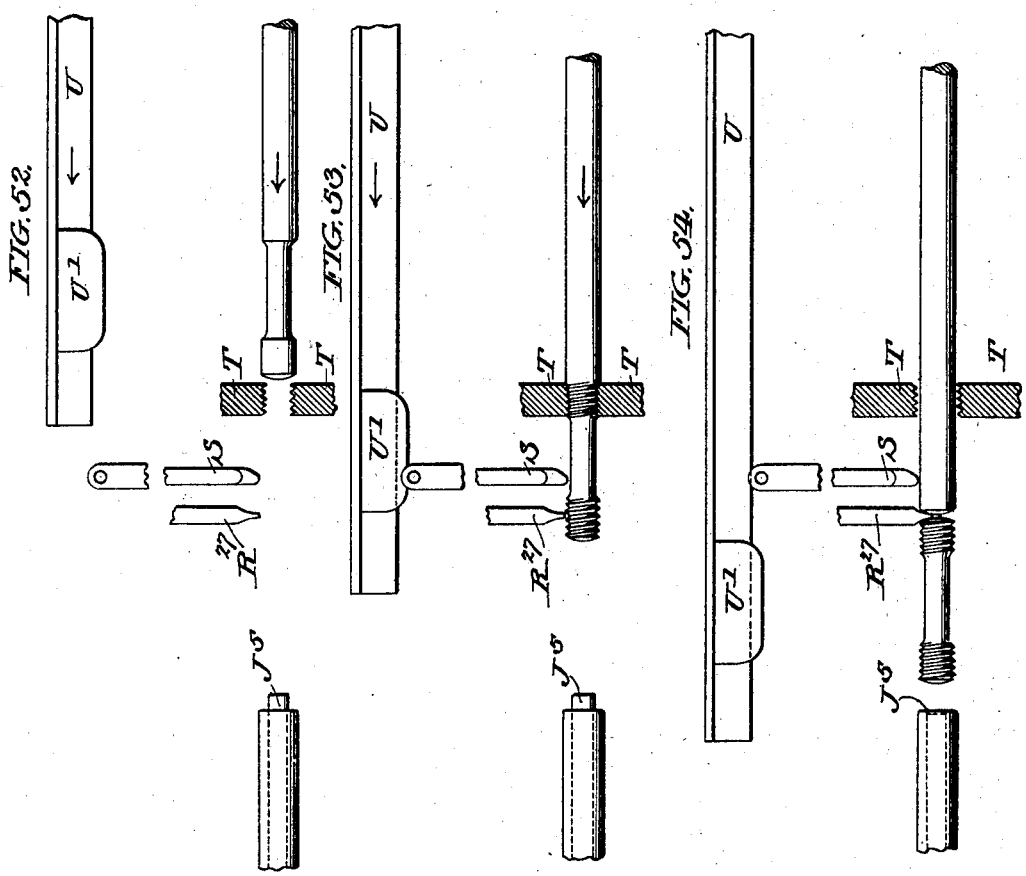
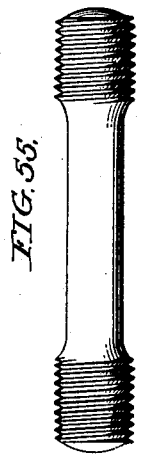
WITNESSES.
INVENTOR.

UNITED STATES PATENT OFFICE.

ALONZO W. EPRIGHT, OF ALTOONA, PENNSYLVANIA.

BOLT-CUTTING MACHINE.

SPECIFICATION forming part of Letters Patent No. 692,258, dated February 4, 1902.

Application filed March 1, 1901. Serial No. 49,404. (No model.)

*To all whom it may concern:*

Be it known that I, ALONZO W. EPRIGHT, a citizen of the United States of America, residing in Altoona, in the county of Blair and State of Pennsylvania, have invented a certain new and useful Improvement in Bolt-Cutting Machines, of which the following is a true and exact description, reference being had to the accompanying drawings, which form a part thereof.

My invention relates to machinery for cutting bolts, and is particularly adapted for the manufacture of stay-bolts, such as are used in the construction of locomotive and other boilers.

The object of my invention is to provide a machine which will with great rapidity and accuracy cut the bolts from a rod or bar of iron, the movements of the machine being preferably entirely automatic.

The leading feature of my invention consists in the combination, in a bolt-cutting machine, of successively-acting cutting devices, one acting to cut down the body of the portion of the rod to be formed into a bolt intermediate what are to be the threaded ends of the said bolt, another acting to form the threads at each side of the cut-down portion, and a third acting to sever the completed bolt from the rod, the machine being provided with appropriate mechanism for longitudinally moving and at the same time rotating the rod upon which the cutting-tools act.

My invention further consists in various features of the organization of the machine, both those governing the movements of the bar and those governing the movements of the cutting-tools, all of which will be best understood as described in connection with the drawings, in which I have illustrated my machine in what I believe to be its best and most convenient form, and in which—

Figures 1 and 1ª together make up a side elevation of my bolt-cutting machine. Fig. 2 is an end view of the said machine; Fig. 3, a detail showing one end of the slotted dogs used in connection with my machine; Fig. 4, a plan view, on an enlarged scale, of a portion of my machine comprising the chuck-clutch which grips the rod and the head in which are supported and guided the cutting-tools. Fig. 5 is a vertical longitudinal central section through the stop device at the end of the machine. Fig. 6 is a side elevation, on an enlarged scale, of the head supporting the cutting-tools. Fig. 7 is a central section through said head, taken as on the line 7 7 of Fig. 8. Fig. 8 is a front view of said head, with its upper portion shown in section, as on the line 8 8 of Fig. 7. Fig. 9 is a face view of a washer $S^x$, which is a detail of the mechanism. Fig. 10 is a face view of the gear-wheel and attached cam indicated at $s^{19}$ in Fig. 8. Fig. 11 is a cross-sectional view of the head and connected mechanism, taken as on the section-line 11 11 of Fig. 7. Fig. 12 is an elevation of the lower portion of the head, showing the cutting-off tool and mechanism for actuating it. Fig. 13 is a side elevation, on an enlarged scale, of the gear-wheel $S^{18}$ and the cams attached thereto. Fig. 14 is a front view of said wheel and cams. Fig. 15 is a front view of the downwardly-extending lug $S^9$ of the slide $S^6$. Fig. 16 is a side elevation of the same downwardly-extending lug. Fig. 17 is an elevation of one of the adjustable bearings indicated at $S^{12}$. Fig. 18 is a side elevation of the projecting parts of the bearing-pins supported in the bearings $S^{12}$. Fig. 19 is a front view of the chuck, shown as taken on the section-line 19 19 of Fig. 1. Fig. 20 is a side elevation of the slide holding the cutting-off tool, shown partly in section on the line 20 20 of Fig. 21. Fig. 21 is an end elevation of the same slide. Fig. 22 is a front elevation of the active parts of the chuck-clutch. Fig. 23 is a longitudinal section through said chuck-clutch on the line 23 23 of Fig. 22. Fig. 24 is a cross-section on the line 24 24 of Fig. 23. Fig. 25 is a longitudinal vertical section taken through the center of the hollow feed-shaft and showing the parts of the machine which directly act upon and give motion to said feed-shaft. Fig. 26 is a side elevation of the rotatable sleeve which serves as a bearing for the hollow feed-shaft. Fig. 27 is an elevation of one of the two splines sliding in longitudinal grooves in the sleeve B. Fig. 28 is a side elevation of the clutching device secured to the splines of Fig. 27, and Fig. 29 is a front view of the same clutching device. Fig. 30 is a cross-sectional view on the section-line 30 30 of Fig. 25. Fig. 31 is a front view of the cam $1^8$ and devices immediately connected therewith. Fig. 32 is a cross-section on the line 32 32 of Fig. 31. Fig. 33 is a side elevation of the sprocket-wheel and hub on which the cam $I^8$ is clamped. Fig. 34 is a side elevation of one of the elements of the adjusting device for the cam $I^{11}$. Fig. 35 is a longitudinal sectional view taken as on the line 35 35 of Figs. 1 and $1^a$. Fig. 36 is a side elevation of the main structure of the head in which the cutting-tools are supported and move. Fig. 37 is a similar elevation of a detachable portion of said head. Fig. 38 is a top view of the slide supporting the rest upon which the rod is supported while being cut down. Fig. 39 is a side elevation of said slide; Fig. 40, an end view of said slide. Fig. 41 is a side elevation, and Fig. 42 an end view, of the rod-support; Fig. 43, a side elevation, and Fig. 44 an end view, of one of the slides which support the thread-cutting dies. Fig. 45 is a side elevation of a guide-plate used in connection with said slides. Fig. 46 is a rear elevation of a mechanism which feeds the rod through the clutch-chuck. Fig. 47 is a side elevation of the same device; Fig. 48, a cross-section on the line 48 48 of Fig. 46, and Fig. 49 a horizontal section on the irregular line 49 49 of Fig. 48. Fig. 50 is a diagrammatic view showing the position of the bolt-cutting devices, the stop, and the cam controlling the motions of the cutting-down tool at the time when the rod is fed to a position abutting against the stop. Fig. 51 shows the same parts during the operation of cutting down the central part of the bolt. Fig. 52 shows the same parts at the end of the rearward motion of the rod. Fig. 53 shows the same parts during the completion of the thread-cutting operation. Fig. 54 shows the same parts during the cutting off of the bolt from the rod. Fig. 55 shows a completed bolt as made on my machine, and Fig. 56 a similar bolt of somewhat-modified form.

A indicates the framing-support of the machine; A', Figs. $1^a$ and 2, an independent standard supporting the rod-feeding mechanism.

$A^2$ $A^2$, &c., indicate the bearings in the frame for the shaft I', upon which are situated the various selecting devices controlling most of the automatic movements of the machine.

$A^3$ $A^3$ indicate parallel guides at the top of the frame, upon which the tool-holding head is adjustably secured and upon which the frame supporting the chuck-clutch slides. As shown, the supplemental frame $A^4$, which supports the sleeve-bearing of the feed-shaft and certain other devices, is also adjustably secured on these guides. $A^5$ $A^5$ indicate the bearings proper, supported on the frame $A^4$.

B (see Figs. 25, 26, and 30) is a sleeve rotatably supported in the bearings $A^5$ $A^5$. As shown, it is formed with an annular shoulder B' at one end and provided with an annulus $b'$ to fit on its opposite end, (see Fig. 25,) so as to prevent longitudinal movement in its bearings. The sleeve is made with one or more longitudinal grooves $B^2$, preferably two, as shown, and also, as shown, though this is a mere matter of convenience, has a gear-wheel $B^3$ cut in its outer face.

$B^4$ $B^4$ indicate splines or feathers situated and longitudinally movable in the slots $B^2$, these feathers being fastened to an annular sleeve having projecting lugs $B^6$ and $B^7$ at its opposite ends. (See Figs. 25, 28, and 29.)

$B^8$ (see Fig. 25) is an annular sleeve fastened to the opposite ends of the feathers $B^4$, formed with an annular groove $B^9$ to receive the ends of the jaws of a forked lever, by which it is actuated and by means of which and the feathers $B^4$ the cam-ring $B^5$ is moved in one direction or the other.

$B^{10}$ (see Fig. 25) is a belt-wheel journaled on the sleeve B and having projecting from its side the clutch or engaging pin, (indicated at $B^{11}$,) while from the other side of the hub of the belt-wheel projects the gear-wheel $B^{12}$.

$B^{13}$ is a sleeve journaled on the sleeve B and held in position thereon, as shown, by a collar $b^{13}$, said sleeve supporting in an enlarged portion an engaging or clutch pin $B^{14}$ and also the gear-wheel $B^{15}$.

$B^{16}$ is a gear-wheel secured on the sleeve B in close proximity to the gear $B^3$, already described.

$B^{17}$ (see Fig. 25) is a feather or spline secured on the inside of the sleeve B and adapted to extend into the longitudinal exterior groove C' of the hollow feed-shaft C, which fits inside of the sleeve B and is keyed to turn therewith while free to move longitudinally in the sleeve.

$C^2$ (see Figs. $1^a$ and 25) is a head firmly secured to the outer end of the hollow shaft C and moving on guides $C^4$, said head having a downwardly-projecting portion $C^3$, to which is secured the end $C^5$ of a feed-screw, (indicated at $C^6$.) At the inner end of the hollow shaft C (see Figs. 1 and 33) there is formed or secured a head $C^7$, the inner end of which is made cylindrical and is secured in the slide $C^{14}$. The inner portion of this annular cylindrical portion is threaded, and in the rear of this annulus the head $C^7$ is of cylindrical form, as indicated at $C^9$, and formed with transverse slots $C^{10}$.

$C^{12}$ (see Fig. 24) is a feather projecting out from the cylindrical surface $C^9$, and $C^{13}$ $C^{13}$ are perforations extending through the head transversely to the slots $C^{10}$, in which are secured the pivot-pins $D^6$, to be hereinafter described. The bearing $C^{14}$, which supports the head $C^7$, as already stated, rises from a slide $C^{15}$, (see Figs. 1, 4, and 19,) which moves on the guideways $A^3$, and the bearing has projecting from its opposite sides the lugs $C^{16}$ $C^{16}$, which support the pivots to which the cam-bars U U are secured.

D (best shown in Fig. 23) is a stationary clutch-actuating device having a frusto-conical face, (indicated at D'.) This stationary clutch-actuating device is, however, adjustable in the head $C^7$, being externally threaded and screwing into the internally-threaded portion $C^{11}$ of the head, $d$ indicating a set-screw for holding it in any determined position.

$D^2$ is a sleeve longitudinally movable in an internal bearing formed in the head $C^7$ and indicated at $C^\times$, this sleeve having at its outer end the movable clutch-actuating head $D^3$, formed with a frusto-conical face $D^4$, oppositely inclined to that of the stationary head D.

$D^5 D^5$, &c., are the jaws proper of the clutch-chuck having frusto-conical ends, as indicated, said jaws lying between the fixed and movable actuating-heads D and $D^3$, so that when the movable head is moved toward the stationary head the jaws will be pressed toward the center and made to grip the rod passing between them, while when the movable head is retracted the jaws will relax their grip on the rod and permit it to move freely. This clutch-and-chuck device is made adjustable to radius of different diameter by the adjustment of the stationary head.

$D^6 D^6$ indicate pivot-pins passing through the slots $C^{10}$ and supporting the levers $D^7 D^8$ $D^7 D^8$, the short ends of which act against shoulders of the movable chuck $D^3$, as shown, while the long ends $D^8$ are shaped so as to lie close to or beyond the outer face of the head $C^7$, so as to be operated upon by the cam having the annular face $D^9$ and the conical face $D^{10}$. This cam is prevented from turning on the cylindrical portion $C^9$ of the head $C^7$ by the feather $C^{12}$ (see Fig. 24) and has attached to it the annulus $D^{11}$, formed with the annular slot $D^{12}$, which are engaged by the arms $D^{13} D^{13}$ (see Fig. 19) of the lever $D^{15}$, pivoted on the pin $D^{14}$, and the lower end of which is engaged by the forked end $D^{16}$ of a lever $D^{16} D^{17}$, pivoted on the pin $D^{18}$, extending out from the bracket $D^{19}$, which in turn extends from the bottom of the head $D^{15}$. It will be obvious that each movement of the lever $D^{16} D^{17}$ is communicated to the sliding cam $D^9 D^{10}$ and that when the cam is moved in the direction to bring its annular face over the lever ends $D^8$ said lever ends will be depressed and the movable head $D^3$ moved in position to cause the rod to be gripped, while a movement of the cam in the opposite direction by permitting the lever ends $D^8$ to rise on the conical faces $D^{10}$ of the cam will cause the clutch to release its hold on the rod. The movements of the cam controlling the chuck-clutch are controlled by the selecting-dogs $L^8 l^8$ on the disk $K^6$, the end of the lever $D^{17}$ being always in a position to be acted on by these dogs when the clutch is in its extreme forward position.

Returning now to the mechanism for giving motion to the hollow feed-shaft C and through it to the chuck-clutch, E (best shown in Fig. 25) is a hollow sleeve-like shaft supported in bearings in the cross-bars of the frame, (indicated at $a^4 a^5$.) Secured to the outer end of this sleeve, so as to rotate with it, is the feed-nut, (indicated at $E'$,) through which extends the feed-screw $C^6$, the rear end of which is free to move through the hollow sleeve E and the front end of which, as already described, is attached to the feed-shaft C.

$E^2$, $E^3$, $E^4$, and $E^5$ are gear-wheels of varying diameter journaled on the sleeve E and each having a clutch-pin or equivalent device extending from its side, as indicated at $e^2$, $e^3$, $e^4$, and $e^5$.

$E^6$, $E^7$, and $E^8$ are sleeves geared to rotate with the sleeve E and so as to be freely movable longitudinally on said sleeve. Each of these sleeves is circumferentially grooved, so as to be engaged by a yoke-lever, and the sleeve $E^6$ is provided with a clutch-lug $e^6$, adapted in one position of the sleeve to engage with the clutch-pin $e^2$. The sleeve $E^7$ is provided with a lug $e^7$, adapted to engage with the pin $e^3$, and the sleeve $E^8$ is provided with two lugs, (indicated at $e^8 e^9$,) so as to enable it to be engaged by the pin $e^4$ when moved in one direction and by the pin $e^5$ when moved in the other direction. The gear-wheel $E^3$ is in engagement with the gear $B^3$, cut on the sleeve B, and the gear $E^4$ is, through the intermediate wheel $E^a$, Figs. $1^a$ and 25, in engagement with the gear-wheel $B^{16}$, secured to and rotating with the sleeve B. The gear-wheels $E^2$ and $E^5$ are both driven through a train of gears, which I will immediately describe, from the gear-wheel $B^{12}$, secured to the belt-wheel $B^{10}$ and rotating on the shaft B. Thus the gear-wheel $E^2$ (see Figs. $1^a$, 2, and 25) is in engagement with a gear-wheel F, which also engages with the gear-wheel $F^3$, secured to the shaft $F^4$. As shown, (see Fig. 2,) the gear-wheel F is journaled on a stud supported on the slotted link $F'$ and working in the slot of another link $F^2$, these slotted links enabling gear-wheels of varying sizes to be substituted for the gear-wheel F, (shown in the drawings,) a substitution which is at times desirable in the adaptation of the machine to bolts of different kinds. The shaft $F^4$, to which the gear-wheel $F^3$ is attached, has also attached to it a gear-wheel $F^5$, engaging and driving the gear-wheel $E^5$. It has also attached to it a sprocket-wheel $F^6$ and a gear-wheel $F^7$, by means of which it is driven, said gear-wheel engaging a gear-wheel $F^8$, attached to a sleeve $F^9$, journaled on a stud $F^{12}$ and having attached to it also gear-wheels $F^{10}$ and $F^{11}$, the first of which is in engagement with a gear-wheel $B^{12}$, while the second gear wheel is in engagement with a gear-wheel $B^{15}$. It will be obvious from the nature of the gear connections described that the sleeve B and the gears $B^3$ and $B^{16}$ directly driven by it will be stationary when the clutch-ring $B^5$ is in its intermediate position, engaging neither the belt-wheel $B^{10}$ nor the sleeve $B^{13}$. When it is shifted to engage directly with the pulley-wheel, the sleeve and its connections will be rotated at a high rate of speed, and when it is shifted to engage with the sleeve $B^{13}$ the sleeve and its connections will be rotated at a lower rate of speed. It is obvious also that the sleeve E through its gear-wheels $E^3$ and $E^4$ can be rotated at two different rates of speed in either direction. It will also be obvious that the shaft $F^4$ and the gear-wheels $F^5$ and $F^3$ will always rotate with the same speed—that determined by the pulley-wheel $B^{10}$. Hence the spindle E can receive through its gear-wheels $E^5$ and $E^2$ only one rate of speed in either direction.

Returning now to the gearing, (shown best in Figs $1^a$ and 2,) the shaft $F^4$ has attached to it a gear-wheel $f^3$, (see Fig. 25,) which is in engagement with a gear $F^{13}$, which for purposes of adjustment is supported, preferably, like the gear-wheel F, on the slotted links $F^{14}$ and $F^{15}$. Rotating with the gear-wheel $F^{13}$ is the small gear $F^{16}$, which engages and drives the gear-wheel $F^{17}$, which in turn engages and drives the gear-wheel $F^{18}$, attached to a sleeve $H^{13}$, (see Fig. 35,) journaled on a shaft $H^6$, with which it is capable of being connected with mechanism to be hereinafter described and through which it drives the bevel-gear $F^{19}$, which engages the bevel-gear $F^{20}$ on the transverse shaft $F^{21}$, said transverse shaft carrying the sprocket-wheel $F^2$ and the worm $F^{23}$, the sprocket-wheel being in driving connection, through a chain $F^{24}$, with a sprocket-wheel G, which (see Figs. 46 to 49, inclusive) is attached to a shaft $G'$, having formed upon it right and left threaded worm-wheels $G^2$ and $G^3$, said shaft being journaled in the feed-box (shown in the figures last referred to) and the worms in engagement with the worm-wheels $G^4$ and $G^5$, pivoted on the studs $G^6$ $G^6$, which have their bearings in the slides $G^8$ $G^8$, from which slides extend the stop-pins, (indicated at $g^7$ $g^7$,) moving in slots in the containing-box. The stud-shafts $G^6$ have also attached to them the friction-wheels $G^7$, and they are normally pressed together by the action of the springs $G^{11}$ $G^{11}$, the force of which can be adjusted by the adjustable abutments $G^{10}$. These friction-wheels $G^7$ when pressed inward project inside of the passage $G^{13}$, through which the rod is passed, and, gripping the rod, act to feed it forward through the hollow feed-shaft C, the rod being also supported on the conical bearing-rolls, (indicated at $G^{14}$.) Through each of the slides $G^8$ extends an adjustable screw, as indicated at $G^9$, and between the ends of these adjustable screws works the wedge-shaped cam $G^{12}$, which when pressed inward forces the slides apart, so that the friction-rolls release their hold upon the rod, and which when moved outward permits the slides and friction-rolls to move in and grip the rod. This wedge-shaped cam $G^{12}$ is actuated (see Fig. $1^a$) by a lever $G^{15}$ $G^{16}$, pivoted at $G^{17}$, the end $G^{16}$ being acted on at proper intervals by the selecting-dogs L $l$, attached to the disk K, which, like the greater number of the selecting devices on my machine, are secured to the rotating shaft $I'$, which shaft is driven by the worm-wheel I, in turn driven by the worm $F^{23}$ on the shaft $F^{21}$.

It is desirable for the efficient working of the machine that the shaft $I'$ and its selecting devices should move at times with different rates of speed, and this I accomplish in the construction illustrated by providing for the driving of the shaft $H^6$, through which motion is communicated to the shaft $I'$, at varying speeds. On this shaft $H^6$ (best shown in Fig. 35) there is journaled, as already stated, the sleeve $H^{13}$, driven through the gear-wheel $F^{18}$ and having at its inner end a clutch, (indicated at $H^{14}$.) I also journal on the shaft $H^6$ another sleeve (indicated at $H^4$) having a clutch $H^5$, lying opposite to the clutch $H^{14}$ of the first sleeve and driven through a gear-wheel $H^3$ by a gear-wheel $H^2$, which is journaled on a shaft H (see Figs. 1 and 30) and driven through a sprocket-wheel $H'$, attached to its head by a chain $F^{25}$, which passes over the sprocket-wheel $F^6$ on the shaft $F^4$. The two sleeves on the shaft $H^6$ are thus moving in the same direction, but with different speeds, and on the intermediate part of the shaft $H^6$ is situated the sleeve $H^8$, connected with the shaft by a slot and feather, as indicated at $H^7$ and $H^{12}$, so as to rotate with the shaft and be free to slide in either direction. This sleeve has clutch devices $H^9$ and $H^{10}$ at its opposite ends, so as to engage at will with the clutch $H^{14}$ or the clutch $H^5$, and it is provided with an annular slot $H^{11}$, through which it is engaged (see Fig. 1) by the forked arm $Q^6$ of a lever $Q^6$ $Q^5$, pivoted at $Q^7$ and connected by a link $Q^3$ with a lever $Q'$ Q, pivoted at $Q^2$ and acted on at proper intervals by the selecting-dogs $L^7$ $l^7$ on the rotating disk $K^5$.

The shaft $I'$, in addition to the selecting-disk secured to it, has at its rear end a sprocket-wheel $I^2$, by which it is placed in driving connection through a chain $I^3$ with a sprocket-wheel $I^4$, attached to a shaft $I^5$. (See Figs. 1, 31, 32, 33, and 34.) The sprocket-wheel $I^4$ has on the inner face of its hub a toothed clutch, (indicated at $i^4$,) which is engaged with a toothed clutch $i^6$ on an annulus $I^6$, secured fast to the shaft $I^5$. The hub of the sprocket $I^4$ projects to form a bearing for the cam $I^8$, which is secured upon it by the clamping-nut $I^7$, and the sprocket-wheel hub is held in engagement with the clutch-ring $I^6$ by the clamping-nut $I^{10}$, which when loosened permits the sprocket-wheel and cam $I^8$ to be adjusted in proper relationship with the cam $I^{11}$, which cam (see Figs. 1 and 12) is secured on the shaft $I^5$ and has secured to its face the cam-dogs, (indicated at $I^{12}$ and $L^{13}$,) the use of which will be hereinafter described. The cam $I^8$ acts upon the arm J of the pivoted lever J $J'$, which through a link $J^2$ and head $J^3$ is connected with the stop-rod $J^4$, $J^5$ indicating the end of this rod, which moves backward and forward in a stationary sleeve, (indicated at $J^6$,) supported on standard $J^7$. (See Fig. 19.) The stop-rod $J^5$ $J^6$ is normally held in retracted position, as shown in Fig. 5, by the action of the spring indicated at $J^8$.

$K\ K'\ K^2$, &c., (see Figs. 1 and $1^a$,) are disk wheels, upon which are secured the selecting-dogs $L\ l\ L'\ l'$, &c. The wheel K, as already explained, actuates through its dogs L and $l$ the lever controlling the friction feed device, by means of which the rod is fed through the shaft C. The disk K', through its feed-dogs $L'\ l'$, acts upon the arm M of the lever M M', pivoted at $M^2$ and actuating the sliding clutch $E^6$. The disk $K^2$, through its dogs $L^2\ l^2$, acts on the end N of the lever N N', pivoted at $N^2$ on a bracket $N^3$, and having its end N' forked, so as to engage the clutch-ring $E^7$. The disk $K^3$, having, as shown, four dogs $L^3\ l^3$ $L^4\ l^4$, acts on the end O of the lever O O', pivoted at $O^2$ and connected at top to actuate the double clutch-ring $E^8$, the action of one pair of the dogs being to move the clutch-ring to engaging position in one direction and in the other direction to non-engaging position, and the action of the other pair of dogs being to move it in the opposite direction for engagement and back to the neutral or non-engaging position. The disk $K^4$ has also attached to it the two pairs of selecting-dogs $L^5\ l^5\ L^6\ l^6$, which act upon the end P of the lever P P', pivoted at $P^2$ and connected at top with the sleeve $B^8$, which, as already described in connection with Fig. 25, actuates the clutch $B^5$, the action of the dogs being in the one case to move the clutch to engage with the belt-wheel $B^{10}$ and back to an intermediate position and in the other case to move the dogs to engage with the gear-wheel $B^{15}$ and back to the same intermediate position. The disk $K^5$ is also provided with the dogs $L^7\ l^7$, which act on the end Q of the lever Q Q', pivoted at $Q^2$ and operating, through connections previously described, the clutch-sleeve $H^8$. (Best shown in Fig. 35.) The disk $K^6$ has attached to it the selecting-dogs $L^8\ l^8$, which, as previously stated, act on the lever-arm $D^{17}$, controlling the action of the chuck-clutch at the end of the shaft C. The disk $K^7$ through its dogs $L^9\ l^9$ actuates the lever $s^{29}\ s^{28}$, pivoted at $s^{30}$ and controlling, in a manner to be described, the action of the three cutting-dies. The disk $K^8$ through its dogs $L^{10}\ l^{10}$ actuates the lever $S^{29}\ S^{28}$, pivoted at $S^{30}$ and controlling, through mechanism to be described, the operation of the cutting-down tool.

Referring next to the mechanism which controls and actuates the cutting-tools of my machine, R indicates the main head for supporting the tools and their actuating devices. Different parts of the head structure are shown separately in Figs. 36 to 45, the main portion of the head R being adjustably supported on the guides $A^3$, as indicated, R', Fig. 8, showing a bolt-hole in the bottom of the head, by which a clamping-screw is applied to hold it in place. The lower portion of the head is formed with two slotted openings, (indicated at $R^2\ R^2$ and best shown in Figs. 8 and 11,) in the walls of which is formed a transverse perforation $r^2$, (see Figs. 7, 8, and 36,) through which perforation extends the shaft $S^{23}$, on which are secured the gear-wheels $S^{22}\ S^{22}$. Threaded perforations $R^3$ are formed through the opposite walls of the head R, opening into the upper part of the chambers containing the wheels $S^{22}$.

$R^4$ (see Figs. 6, 7, and 36) indicates the inclined bottom of the chamber formed through the head and through which the rod being acted upon passes.

$R^5$ is a shouldered recess formed in the front of the head, in which is secured the guide-plate, (indicated at $r^5$,) said guide-plate, together with the projecting end of the plate $r^6$, secured on the top face of the head R, forming, with the recess $R^6$, a guideway for the die-holding slides T' T'. On the back of the central part of the guide R are the guideways $R^7\ R^7$, in which move the slides S' s', one of which supports the cutting-down tool and the other of which serves as a back bearing to support the shaft on the side opposite to that being cut by the tool.

$R^8$ is a chamber formed in the upper part of the head R, through which passes the shaft $S^{24}$, journaled in the perforations $R^{10}$ and having attached to it the gear-wheels $S^{22}\ S^{22}$. $R^9$ indicates perforations through the walls of the chamber internally threaded to receive the adjustable shaft-support $s^{12}$.

$R^{11}$ indicates a transverse guideway in which move the slides $S^6\ S^6$.

$R^{12}$ is a separable part of the head having formed in it chambers $R^{14}$, which form continuations of the chambers $R^2$, a threaded segment $R^{13}$, which registers with and completes the threaded perforation $R^3$, and a dovetail guideway $R^{15}$, in which moves the slide supporting the cutting-off tool, as shown in Fig. 12. This slide has an upwardly-extending portion, (indicated at $R^{16}$,) having formed in it a transverse guideway $R^{17}$, (see Figs. 12, 20, and 21,) in which moves the slide $R^{25}$, supporting the cutting-off tool $R^{27}$, which is clamped to the slide by the screw $R^{26}$. The lower part of the main slide is dovetailed, as indicated at $r^{18}$, and formed with an extension $R^{18}$, having in it a recess $R^{19}$, from the rear end of which extends a guide $R^{20}$. A pin $R^{21}$ extends into this perforation $R^{20}$ and has a threaded end $R^{22}$, which is screwed into a standard $R^{23}$, resting in the opening $R^{19}$ and secured to the portion of the head indicated at $R^{12}$. The spring $R^{24}$ acts to hold the slide $R^{16}$ normally in its retracted non-operative position, and a pin $r^{16}$, projecting from the side of the slide, is connected with an actuating-lever $R^{28}\ R^{29}$, pivoted on the head at $R^{30}$ and acted upon to bring the slide and cutting-off tool to position to sever the bolt by the cam $I^{12}$ on the cam-disk $I^{11}$, a second cam $I^{13}$ on said disk acting to retract the cutting-off tool after it has performed its work.

S is the cutting-down tool, which is mounted on a slide S' and secured in position on said slide, as shown, by clamping-screws $S^2$. (See Fig. 11.)

$s\ s^a$ are plates adapted to support the rod while being cut down and formed with grooves which fit in projections $s^2$ of the slide $s'$, the plates $s$ and $s^a$ being adjustable on the slide $s'$ by means of the slots indicated in Fig. 41.

The general construction of the slides S' and $s'$ is shown in Figs. 11, 39, and 40, each of the slides having outwardly-extending lugs $S^3\ s^3$, which are acted upon by the cams U', to be described. Each of the slides is also provided with an outwardly-projecting pin $S^4$ against the head, at the end of which presses the spring $S^5$, the effect of which is to normally hold the slide out of operative position.

$S^6\ S^6$ are slides moving in the guideways $R^{11}$ and having supporting-faces $S^7$ at their upper ends, beyond which extend the back bearings $S^8$ for the plates U U. From the inner ends of the slides $S^6$ extend downwardly the lugs $S^9$, centrally perforated, as indicated at $S^{11}$, (see Figs. 15 and 16,) and provided with outwardly-extending cam-lugs $S^{10}\ S^{10}$.

$S^{12}$ indicates hollow externally-threaded bearings screwing into the threaded perforations $R^3$ and supporting the shafts or rods $S^{13}\ S^{13}$, the inner ends of which are enlarged, as indicated at $S^{14}$, and formed, as indicated at $S^{16}$, to fit together with a sliding joint. (See Fig. 18.) The rods $S^{13}$ extend through the screw-bearings and are threaded at their outer ends, which extend through the end walls $S^{15}$ of the screw-bearings, the rods being secured in place by the nuts $S^{17}$, screwing down on the locking-washer $S^{\times}$.

$S^{18}\ S^{18}$ are gear-wheels journaled on the enlarged portions $S^{14}$ of the shafts and having on their hubs or faces cam projections, as indicated at $S^{20}$ and $S^{21}$, Figs. 13 and 14, these cam-lugs being adapted to operate upon the cam-lugs $S^{10}$ of the slides $S^6$, which slides are normally pressed outward by the action of the spring $S^9$. (Shown in Fig. 11.) It will be obvious that when the lug $S^{20}$ is thrust against the lug $S^{10}$ the slides $S^6$ will be forced inward toward each other through a distance corresponding to the height of the cam-lugs and that if the gear-wheels $S^{18}$ are further rotated, so as to make the lugs $S^{21}$ act on the lugs $S^{10}$, the slides will be still further brought together. The arrangement shown therefore enables me to adjust the inward movement of the slides, which regulates the inward movement of the cutting-down tool to either one of two predetermined amounts, and the action of the cutting-down tool regulated by the slides is also further adjustable by the screwing in or out of the bearings $S^{12}$. The gear-wheels $S^{18}$ are in engagement with the gear-wheels $S^{22}$, secured on the shaft $S^{23}$, to the end of which shaft is also secured the head $S^{24}$, having extending from it the lever-arm $S^{25}$ and also, preferably, (see Fig. 6,) the point $S^{26}$, indicating on a scale on the side of the head the amount of movement given to the shaft $S^{23}$. The lever $S^{25}$ and the shaft and gear-wheels controlled through it are given an oscillating movement through the link $S^{27}$ (see Fig. 1) and the lever $S^{28}\ S^{29}$ by means of the selecting-dogs attached to the gear-wheel $K^8$, and the extent of the oscillating movement can be readily changed by changing the selecting-dogs, so that they will impart a greater or less movement to the lever and the parts operated thereby.

T T are the thread-cutting dies, which are secured, as shown, (see Fig. 8,) on the slides T' T', having upwardly-extending lugs $T^2$, on which are formed the outwardly-extending cam-lugs $T^3\ T^3$. Like the slides S' $s'$, these slides T' T' are normally drawn outward by the action of springs $S^5$, acting exactly like the similar springs connected with the slides S'. The slides are forced inward by mechanism very similar to that acting on the slides S', adjusting screw-bearings $s^{12}$ working through the threaded perforations $R^9$ and supporting shafts $s^{13}$, upon enlarged ends of which are journaled gear-wheels $s^{18}$, having projecting cam-lugs $s^{19}$, adapted to act upon the cam-lugs $T^3$ of the slides. The gear-wheels $s^{18}$ are given an oscillating movement by the gear-wheels $S^{22}$, attached to the transverse shaft $S^{24}$, having connected with its end the lever-arm $s^{25}$, which in turn is connected by a link $s^{27}$, actuated by a lever $s^{28}$, and arm $s^{29}$, actuated by the selecting-dogs on the disk $K^7$.

U U are cam-supporting bars pivotally secured to the lugs $C^{16}$ of the sliding head $C^{14}$. (See Fig. 4.) These bars U are preferably made with a series of perforations extending through them, so that cam-plates U' U' can be adjusted at any desired point along their length. The bars rest upon the heads $S^7\ S^7$ of the slides $S^6$ and against the back bearings $S^8$ of said slides, and they support the cam-plates U' at such a level that as the bars reciprocate with the chuck-holding head $C^{14}$ the cam-plates will at determined intervals press against the outwardly-extending lugs $S^3$ of the heads S' $s'$. When the slides $S^6$ are in their outer or normal positions, the cams can pass backward and forward without acting on the slide extensions $S^3$; but when the slides $S^6$ are moved inward the bars U and the cam supported on the bars are pressed into operative position.

The various features and operative combinations of my machine having been fully described, the operation of the machine as a whole can be clearly indicated in few words.

Immediately after the cutting off of a bolt from the end of the rod, as indicated in Fig. 54, the selecting-dogs on the disk K act upon the lever $G^{16}\ G^{15}$, thrusting out the wedge-shaped cam from between the slides $G^8$ and permitting the friction-rolls $G^7$ to engage the end of the bar and feed it forward through the chuck-clutch, which has been opened immediately after the severance of the bolt from the end of the bar, until the end of the bar impinges against the stop $J^5$, which of course is in its operative position at this time. The relationship of the cutting-off tools to the bar at this period is indicated in Fig. 50, and the bar being in this position the proper cam acts upon the chuck-clutch, so that it will close down upon the bar and grip it firmly to the hollow feed-rod C, after which the wedge-shaped cam acting on the friction-wheels is again thrust in, so as to press the wheels outward out of contact with the bar. The bar being now in position to be operated upon, the clutch $B^5$, which has been in intermediate non-engaged position, is moved by its controlling selecting device so as to engage with the gear-wheel $B^{15}$, the relatively slow rotary motion of which is imparted to the sleeve B and the hollow shaft C, and immediately afterward the clutch $E^6$ is moved by its appropriate controlling-dogs into engagement with the gear-wheel $E^2$, which is driven through the train of gear already described from the pulley-wheel $B^{10}$ and which rotates in such a direction as to turn the feed-nut $E'$ in the direction to move the hollow shaft C outward and at proper speed for the cutting-down operation to be performed on the center of the bolt. When in the retraction of the hollow feed-rod C and its connected clutch-head and of the bars U U, connected with said head, the cams $U'$ act upon the slide holding the cutting-down tool S, this tool is forced into operative position, as indicated in Fig. 51, and held in such operative position until the center of the bolt to be formed is cut away, as indicated in Fig. 52, after which the cutting-down tool is retracted and the bolt still further retracted to the position shown in Fig. 52, but preferably at increased speed, the clutch $E^6$ being moved to release it from connection with the gear-wheel $E^2$ and the clutch $E^8$ being by its appropriate selecting devices moved to position to engage with the gear-wheel $E^4$, which is running in the same direction as the gear $E^2$, but at greater speed, being driven through the intermediate gear $E^q$ by the gear-wheel $B^{16}$ on the sleeve B. It will also be obvious that for the retraction of the rod from the position shown in Fig. 50 until immediately prior to the operation of the cam $U'$ on the cutting-down tool the same high speed may be employed with some economy of time, the low retracting speed of the gear-wheel being thus only employed during the actual cutting down of the bolt, and it will also be obvious that increased speed in the retraction of the rod can be attained by moving the clutch $B^5$ so as to engage the pulley-wheel $B^{10}$, which will give the gear-wheel $B^{16}$ a higher rate of movement, and consequently drive the feed-nut at greater speed when coupled with said gear-wheel, but will not at all affect the retractive speed imparted to the feed-shaft when the feed-nut is coupled to the gear-wheel $E^2$, because said last-mentioned gear-wheel is always driven with speed proportionate to that of the pulley-wheel $B^{10}$.

When the bolt has been retracted to the position indicated in Fig. 52, the clutch $E^8$ is moved to non-engaging position, this being preferably accomplished by the impingement of the pin V on the slide $C^{15}$ against the end $v'$ of the lever $v'$ $v^2$, pivoted on the slide $C^{15}$ and acting on the rod $v^4$, and through it, by means of a projecting arm $v^5$ on the lever, controlling the clutch. After the arrest of the rearward motion of the bar and after its end has passed to the front of the dies T T these dies are closed down to operative position by the action of the slides and mechanism described, and then the clutch $B^5$ is moved to engage with the gear-wheel $B^{15}$ and the clutch $E^7$ to engage with the gear-wheel $E^3$, causing the feed-nut to revolve at the proper speed for the forward feed of the rod while it is being threaded by the dies. After the thread is formed on the front end of the rod and while the thread-cutting dies are moving over the cut-down central portion of the bolt the advance of the rod may be increased by disconnecting the clutch $E^7$ and moving the clutch $E^8$ to couple with the gear-wheel $E^5$, which, rotating the feed-nut with greater speed, will increase the rapidity of the rod's advancing movement; but the gear-wheel $E^5$ is disconnected and the gear-wheel $E^3$ connected with the feed-nut before the thread-cutting dies again operate upon the rear end of the bolt, and after the thread is formed on said rear end and after the thread-cutting dies are moved out of operative position the fast-speed gear is again operatively connected, so as to move the rod from the position shown in Fig. 53 to that shown in Fig. 54 at increased speed. When the rod reaches the position shown in Fig. 54, the clutches on the feed-nut sleeve are all moved to non-operative position, this being definitely accomplished by the impingement of the pin V on the clutch-slide $C^{15}$ against the arm $v'$ of the lever $v'$ $v^2$, pivoted at $v^3$ and operatively connected with the rod $v^4$, which through arms $v^5$ move the clutch-controlling levers to non-operative position. The rod being then stationary, as far as longitudinal movement goes, but still revolving, the cutting-off tool $R^{27}$ is brought into operation, as shown in Fig. 54, to sever the bolt from the rod, and after said tool is retracted the stop $J^5$, which has been moved backward as the rod passes from the position shown in Fig. 53 to that shown in Fig. 54, is again restored to operative position, the clutch-chuck opened to let the bar pass freely through it, the revolution of the sleeve B stopped, and the frictional rod-feed mechanism set in operation to feed the rod up against the stop $J^5$, as already described.

My bolt-cutting machine, as shown in the drawings and above described, is capable of great modification without departure from the spirit of my invention, and except where special features of construction are specifically called for in the claims I wish it to be distinctly understood that I do not intend the claims to be limited upon specific illustrated constructions.

Having now described my invention, what I claim as new, and desire to secure by Letters Patent, is—

1. In a bolt-cutting machine, means for rotating and longitudinally reciprocating a rod in combination with a tool for cutting down the body of said rod, said tool being adjustable to and from operative position, a sectional thread-cutting die having its parts also adjustable from a center to and from operative position and means for bringing said cutting tool and die into successive operation upon the rod during its successive reciprocations.

2. In a bolt-cutting machine, means for rotating and longitudinally reciprocating a rod in combination with a tool for cutting down the body of said rod, said tool being adjustable to and from operative position, a sectional thread-cutting die having its parts also adjustable from a center to and from operative position, means for bringing said cutting tool and die into successive operation upon the rod during its successive reciprocations, and a second adjustable cutting-tool arranged to operate after the threading-dies and during a dwell in the reciprocating movement of the rod and to sever the threaded bolt from the rod.

3. In a bolt-cutting machine, means for rotating and longitudinally reciprocating a rod, in combination with means for cutting down the body of the end of the rod to be formed into a bolt intermediate the portions thereof to be threaded, said cutting-down means being arranged to come into operation during a backward longitudinal movement of the rod, thread-cutting dies arranged to successively thread the portions of the rod lying at each end of the cut-down portions during the succeeding forward movement of the rod and means for severing the threaded bolt from the rod arranged to operate during a dwell in the reciprocating movement of the rod-rotating mechanism.

4. In a bolt-cutting machine, means for rotating and longitudinally reciprocating a rod at varying speeds in combination with means for cutting down the body of the end of the rod to be formed into a bolt intermediate the portions thereof to be threaded, said cutting-down means being arranged to come into operation during a backward longitudinal movement of the rod, thread-cutting dies arranged to successively thread the portions of the rod lying at each end of the cut-down portions during the succeeding forward movement of the rod and means for severing the threaded bolt from the rod arranged to operate during a dwell in the reciprocating movement of the rod-rotating mechanism.

5. In a bolt-cutting machine, a rod-clamping clutch, in combination with means for actuating said clutch to open or close it, means for rotating said clutch and means for giving it a reciprocating longitudinal motion; a stop arranged to arrest the movement of a rod advancing through the open clutch and automatic means for retracting said stop, means for cutting down the body of the rod end during a backward movement of the rod and of the clutch holding and rotating it, means for threading the rod end on both sides of the cut-down portion during a succeeding forward movement of said rod and clutch, and means for severing the threaded end acting during a dwell in the reciprocating movements of the clutch and rod, the stop being withdrawn during the threading and severing of the bolt and restored to operative position after said bolt is severed from the rod.

6. In a bolt-cutting machine, a rod-clamping clutch, in combination with means for actuating said clutch to open or close it, means for rotating said clutch and means for giving it a reciprocating longitudinal motion; a stop arranged to arrest the movement of a rod advancing through the open clutch and automatic means for retracting said stop, frictional means for feeding the rod through the open clutch and against the stop acting wholly or in part during a dwell in the movements of said clutch, means for cutting down the body of the rod end during a backward movement of the rod and of a clutch holding and rotating it, means for threading the rod end on both sides of the cut-down portion during a succeeding forward movement of said rod and clutch, and means for severing the threaded end acting during a dwell in the reciprocating movements of the clutch and rod, the stop being withdrawn during the threading and severing of the bolt and restored to operative position after said bolt is severed from the rod.

7. In a bolt-cutting machine, a rod-clamping clutch, in combination with means for actuating said clutch to open or close it, means for rotating said clutch at varying speeds and means for giving it a reciprocating longitudinal motion also at varying speeds; a stop arranged to arrest the movement of a rod advancing through the open clutch and automatic means for retracting said stop, means for cutting down the body of the rod end during a backward movement of the rod and of the clutch holding and rotating it, means for threading the rod end on both sides of the cut-down portion during a succeeding forward movement of said rod and clutch, and means for severing the threaded end acting during a dwell in the reciprocating movements of the clutch and rod, the stop being withdrawn during the threading and severing of the bolt and restored to operative position after said bolt is severed from the rod.

8. In a bolt-cutting machine, the combination with means for cutting the bolt on and from the end of a rod, of a hollow feed-shaft C through which the rod is fed, a clutch adapted to grip the rod, said clutch being secured to move with the feed-shaft, a rotatable sleeve serving as a bearing for the feed-shaft which is keyed to rotate therewith while free to move longitudinally therein, means for rotating the sleeve and feed-shaft at varying speeds and means for reciprocating the feed-shaft in the sleeve also at varying speeds.

9. In a bolt-cutting machine, the combination with means for cutting the bolt on and from the end of a rod, of a hollow feed-shaft C through which the rod is fed, a clutch adapted to grip the rod, said clutch being secured to move with the feed-shaft, a rotatable sleeve serving as a bearing for the feed-shaft which is keyed to rotate therewith while free to move longitudinally therein, means for rotating the sleeve and feed-shaft at varying speeds, means for reciprocating the feed-shaft in the sleeve also at varying speeds and automatic means for changing the speed of rotation and the direction and speed of the reciprocating movements.

10. In a bolt-cutting machine, the combination with means for cutting the bolt on and from the end of a rod, of a hollow feed-shaft C through which the rod is fed, a clutch adapted to grip the rod, said clutch being secured to move with the feed-shaft, a rotatable sleeve serving as a bearing for the feed-shaft which is keyed to rotate therewith while free to move longitudinally therein, means for rotating the sleeve and feed-shaft at varying speeds, means for reciprocating the feed-shaft in the sleeve also at varying speeds and automatic means for changing the speed of rotation and the direction and speed of the reciprocating movements said automatic means acting also to disconnect the sleeve and shaft at intervals from their actuating devices.

11. In a bolt-cutting machine, the combination with means for cutting the bolt on and from the end of a rod, of a hollow feed-shaft C through which the rod is fed, a clutch adapted to grip the rod, said clutch being secured to move with the feed-shaft, a rotatable sleeve serving as a bearing for the feed-shaft which is keyed to rotate therewith while free to move longitudinally therein, means for rotating the sleeve and feed-shaft at varying speeds, a feed-nut and screw arranged to reciprocate the feed-shaft, means for rotating the moving member of feeding device at varying speeds and in opposite directions said means being coupled to the means for rotating the sleeve-bearing so as to move in definite relationship thereto and automatic means for actuating the variable-speed and reciprocating devices in determined sequence.

12. In a bolt-cutting machine, the combination with means for cutting the bolt on and from the end of a rod, of a hollow feed-shaft C through which the rod is fed, a clutch adapted to grip the rod, said clutch being secured to move with the feed-shaft, a rotatable sleeve serving as a bearing for the feed-shaft which is keyed to rotate therewith while free to move longitudinally therein, means for rotating the sleeve and feed-shaft at varying speeds, means for reciprocating the feed-shaft in the sleeve and also at varying speeds, a shaft I' carrying selecting devices for regulating the rotation and reciprocation of the sleeve and feed-shaft and means for varying the speed of said shaft at different periods of its rotation automatically governed by a selecting device actuated by it.

13. In a bolt-cutting machine the combination with means for cutting the bolt on and from the end of a rod, of a hollow feed-shaft C through which the rod is fed, a clutch adapted to grip the rod, said clutch being secured to move with the feed-shaft, a rotatable bearing serving as a bearing for the feed-shaft which is keyed to rotate therewith while free to move longitudinally therein, means for rotating the sleeve and feed-shaft at varying speeds, means for reciprocating the feed-shaft in the sleeve also at varying speeds, a frictional feed device for feeding the rod through the hollow feed-shaft and the clutch secured thereto and automatic means for releasing the rod from said device during the cutting of the bolt and reëngaging said rod to feed a fresh section to the cutting devices.

14. In a bolt-cutting machine, the combination with means for cutting the bolt on and from the end of a rod, of a hollow feed-shaft C through which the rod is fed, a clutch adapted to grip the rod, said clutch being secured to move with the feed-shaft, a rotatable bearing serving as a bearing for the feed-shaft which is keyed to rotate therewith while free to move longitudinally therein, means for rotating the sleeve and feed-shaft at varying speeds, means for reciprocating the feed-shaft in the sleeve also at varying speeds, a rotating shaft carrying selecting devices acting in determined sequence to automatically change and shift the motion of the feed-shaft and stop mechanism actuated by a part reciprocating with the feed-shaft and acting to arrest the longitudinal movements of the feed-shaft at the determined limits of its motion.

15. In a machine for cutting bolts from rods, the combination with the rotatable and reciprocable feed-shaft C of a clutch-chuck-supporting head secured on the end of said shaft, an adjustable chuck-jaw guide D secured in said head, a reciprocatory chuck-jaw guide $D^4$ moving through a fixed path in said head, means actuating said chuck-jaw guide $D^4$ and rod-gripping chuck-jaws situated between said guides D and $D^4$.

16. In a machine for cutting bolts from rods, the combination with the rotatable and reciprocable feed-shaft C of a clutch-chuck-supporting head secured on the end of said shaft, an adjustable chuck-jaw guide D secured in said head, a reciprocatory chuck-jaw guide $D^4$ moving through a fixed path in said head, levers $D^7$ $D^8$ pivoted on the head and operating to force the guide $D^4$ toward the guide D, a lever-actuating annular cam $D^9$, $D^{10}$, automatic means for actuating said cam at proper intervals and rod-gripping chuck-jaws situated between the jaw-guides D and D⁴ as described.

17. In a machine for cutting bolts from rods, the combination with mechanism for rotating and longitudinally moving the rod, of a tool-holding head through which the rod passes, a support for a cutting-down tool and an oppositely-disposed rod-support sliding to and from operative positions in the head and normally held in non-operative positions, cam-supporting bars U U reciprocating with the rod and supporting-cams U' U' adapted to act on the tool and rod supports to bring them to operative position, reciprocating back bearings for the bars U U and automatic means for moving to and retracting from operative position said back bearings.

18. In a machine for cutting bolts from rods, the combination with mechanism for rotating and longitudinally moving the rod, of a tool-holding head through which the rod passes, a support for a cutting-down tool and an oppositely-disposed rod-support sliding to and from operative position in the head and normally held in non-operative positions, cam-supporting bars U U, reciprocating with the rod and supporting-cams U' U' adapted to act on the tool and rod supports to bring them to operative position, reciprocating back bearings for the bars U U, said back bearings being attached to slides having cam-lugs S¹⁰, cams S¹⁸ for acting on said cam-lugs and means for actuating said cams to bring the back bearings for the bars U into operative position.

19. In a machine for cutting bolts from rods, the combination with mechanism for rotating and longitudinally moving the rod, of a tool-holding head through which the rod passes, a support for a cutting-down tool and an oppositely-disposed rod-support sliding to and from operative position in the head and normally held in non-operative positions, cam-supporting bars U U reciprocating with the rod and supporting-cams U' U' adapted to act on the tool and rod supports to bring them to operative position, reciprocating back bearings for the bars U U, automatic means for moving to and retracting from operative position said back bearings, screw-cutting-die-supporting slides T' T' moving in the head and normally held out of operative position and automatic means for moving said die-slides to operative position.

20. In a machine for cutting bolts from rods, the combination with mechanism for rotating and longitudinally moving the rod, of a tool-holding head through which the rod passes, a support for a cutting-down tool and an oppositely-disposed rod-support sliding to and from operative position in the head and normally held in non-operative positions, cam-supporting bars U U reciprocating with the rod and supporting-cams U' U' adapted to act on the tool and rod supports to bring them to operative position, reciprocating back bearings for the bars U U, automatic means for moving to and retracting from operative position said back bearings, screw-cutting-die-supporting slides T' T' moving in the head and normally held out of operative position and automatic means for moving said die-slides to operative position, a slide for a cutting-off tool mounted on the head and automatic means for moving said slide and its tool to cut off a bolt acting after the cutting-down and threading tools as described.

ALONZO W. EPRIGHT.

Witnesses:
JOHN GORITY,
ARTHUR TIMM.